March 23, 1943.  W. W. PAGET  2,314,366
DRILLING APPARATUS
Filed April 21, 1942  2 Sheets-Sheet 2
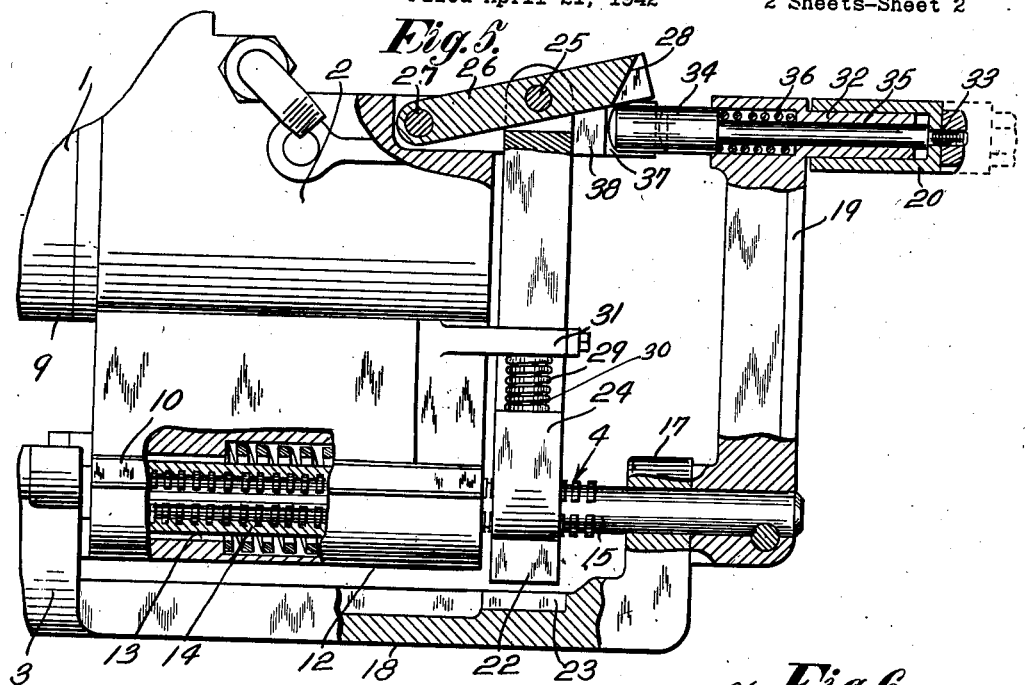
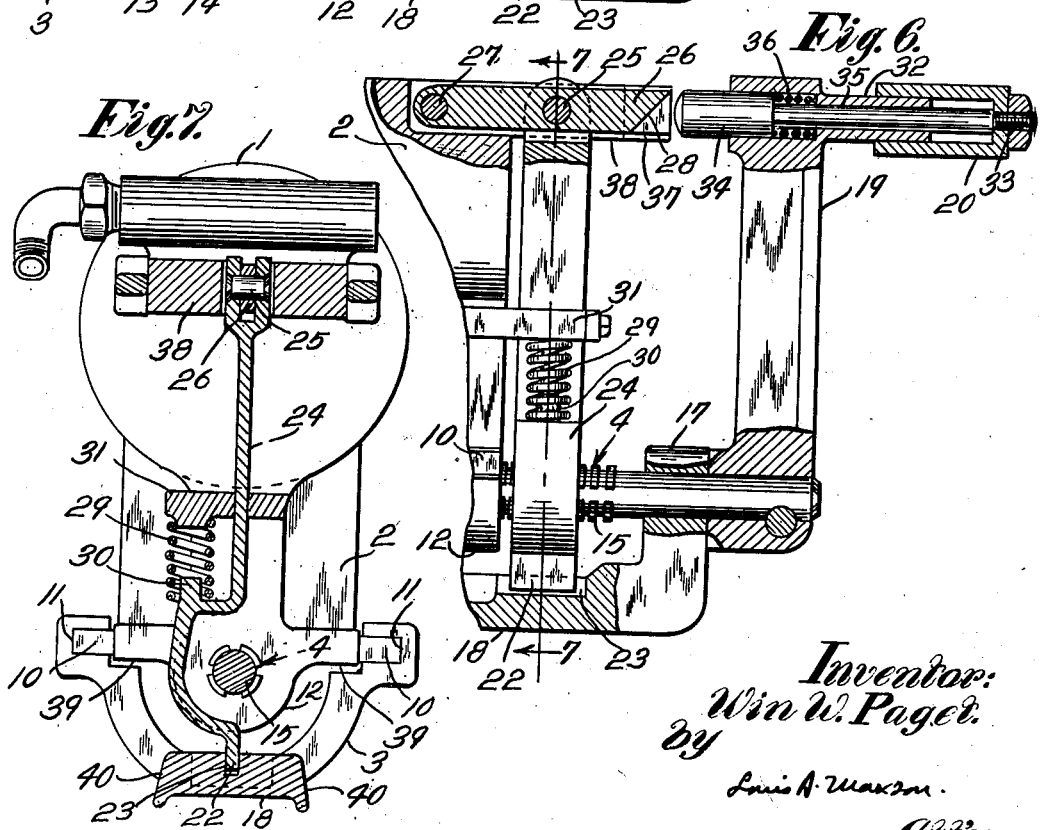
Inventor:
Wm. W. Paget.
By Louis A. Maxson.
Atty.

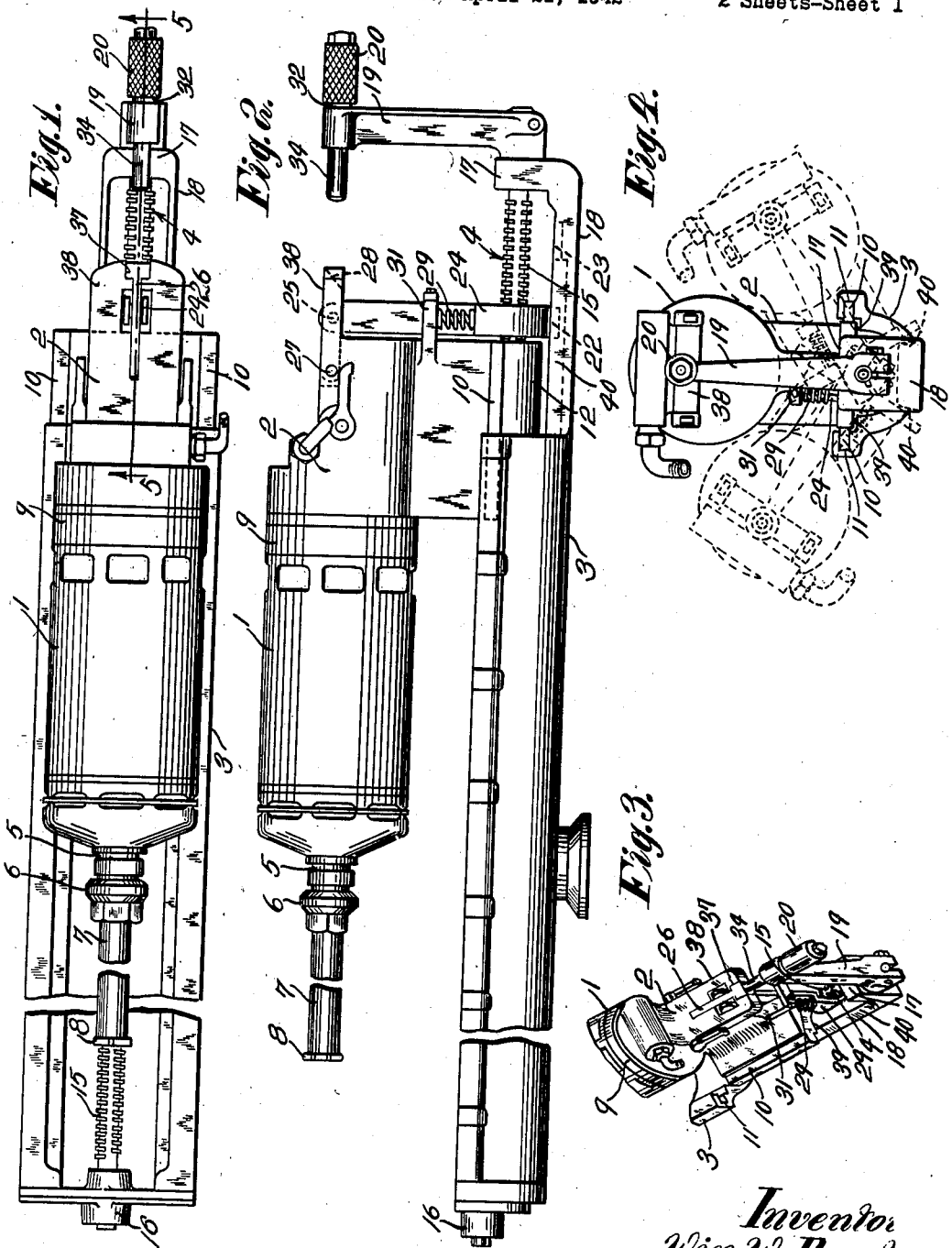

Patented Mar. 23, 1943

2,314,366

UNITED STATES PATENT OFFICE 2,314,366

DRILLING APPARATUS

Win W. Paget, Michigan City, Ind., assignor to Sullivan Machinery Company, a corporation of Massachusetts Application April 21, 1942, Serial No. 439,894

15 Claims. (Cl. 255—47)

This invention relates to drilling apparatus and more particularly to improved mounting means for the drilling motor of a drilling apparatus, for enabling lateral positioning of the drilling motor at one side or the other of the drill hole to clear the latter, thereby to facilitate handling of the drill rods.

In a drilling apparatus of the character disclosed, it is desirable to mount the drilling motor of the apparatus for movement into a position at one side or the other of the drill hole to clear the latter, thereby to facilitate handling of the drill rods. In my earlier filed application Ser. No. 337,277, (U. S. Patent #2,288,542 dated June 30, 1942) the drilling motor was pivotally mounted on a mounting means and was held in drilling position by a releasable lock and, when the lock was released, was manually swingable into a position one side or the other of the drill hole so that the drill rod could be withdrawn from or inserted into the drill hole longitudinally along one side of the drill motor. The present invention is another solution of the problem solved in one way in my earlier filed application above referred to.

An object of the present invention is to provide an improved drilling apparatus for accomplishing the desired results as above outlined. Another object is to provide novel mounting-means for the drilling motor of the drilling apparatus whereby the latter may be moved relative to its mounting-means into a position at one side or the other of the drill hole to clear the latter, thereby to facilitate handling of the drill rods. Still another object is to provide novel pivotal mounting means for the drilling motor of a drilling apparatus. A further object is to provide improved motor-mounting-means associated with the feeding means of the drilling motor whereby an element of the feeding means may be employed to effect swinging of the drilling motor into a position at one side of the drill hole. A still further object is to provide a novel locking arrangement for the drilling motor for, at times, holding the drilling motor in its centrally located drilling position, the lock being associated with an element of the motor-feeding-means. Yet another object is to provide a novel mounting-means for the drilling motor of the drilling apparatus embodying means for swinging the motor laterally on its mounting means to move the same selectively into positions at either side of the drill hole, thereby to enable withdrawal or insertion of the drill rods from or into the drill hole longitudinally along one side of the drilling motor.

With these and other objects in view, the invention also comprises certain novel features of construction, operation and arrangement of parts, which will be hereinafter described and specifically pointed out in the appended claims, reference being had to the accompanying drawings, in which:

Fig. 1 is a top plan view of a drilling apparatus with which an illustrative embodiment of the invention is associated.

Fig. 2 is a side elevational view of the drilling apparatus shown in Fig. 1.

Fig. 3 is a perspective view of the rearward portion of the improved drilling apparatus, illustrating features of the invention.

Fig. 4 is a rear end elevational view of the drilling apparatus with the laterally located positions of the drilling motor indicated in dotted lines.

Fig. 5 is an enlarged fragmentary view in longitudinal vertical section taken substantially on line 5—5 of Fig. 1, with parts shown in full to facilitate illustration.

Fig. 6 is a fragmentary view taken on the plane of Fig. 5, showing parts in a different position.

Fig. 7 is a cross sectional view taken substantially on line 7—7 of Fig. 6.

In this illustrative construction, the invention is shown associated with a drilling apparatus of the rotary type known as a "diamond" drill and which may be generally similar to that disclosed in my copending application Ser. No. 432,951, filed March 2, 1942. It will be evident, however, that the invention may be associated with drilling apparatus of other types.

The drilling apparatus disclosed herein generally comprises a drilling motor 1 mounted on a support 2, in turn mounted for sliding movement along the guideways of a guide shell 3. A manually operable feeding mechanism generally designated 4 is operatively associated with the sliding support 2 for feeding the latter and the drilling motor in either direction along the shell guideways.

The drilling motor is herein preferably of the high speed rotary type and has its power shaft 5 connectible by a conventional chuck 6 to a drill rod 7, the latter carrying the usual diamond drill bit 8. The rear head 9 of the drilling motor is suitably secured to the sliding support 2 and the latter has lateral guides 10, 10 slidingly engageable with the parallel longitudinal guideways 11, 11 of the guide shell. The sliding support 2 is provided with a depending boss 12 extending downwardly within the guide shell between the shell guideways and this boss is formed with a longitudinal bore 13 which receives a non-rotatable feeding element, herein a feed nut 14; and a rotatable feeding element, herein a feed screw 15, journaled on the guide shell is threadedly engaged with this feed nut. The feed screw 15 extends longitudinally centrally within the guide shell and has its forward end journaled in a bearing bracket 16 suitably attached to the forward end of the guide shell, and the rear end of the feed screw is suitably journaled within an upstanding bearing portion 17 integral with a rearwardly projecting, armlike portion 18 of the guide shell. The rearwardly projecting shell portion 18 extends rearwardly with respect to the shell guideways and is relatively narrow as shown in Figs. 3 and 7, for a purpose to be later described. Secured to the rear end of the feed screw 15 is a suitable operating element herein preferably a hand crank 19 having a grasping portion 20 whereby the feed screw may be manually rotated relative to the non-rotatable feed nut to effect feeding of the sliding support 2 together with the drilling motor, longitudinally either forwardly or rearwardly along the shell guideways. As is also fully described in my copending application Ser. No. 432,951, the casing of the motor 1 may be mounted on the sliding support 2 for limited rotative movement with respect thereto, to effect control of the feed screw, thereby automatically to regulate the feed, but since this automatic feed controlling means does not enter into the present invention, further illustration and description thereof are herein unnecessary.

Now referring to the novel mounting means for the drilling motor 1, it will be noted that as the drilling motor approaches its rearmost limit of feed with respect to the guide shell, a vertical locking projection 22 on the sliding support is received in a longitudinal slot 23 on the upper portion of the guide shell projection 18, and as this locking projection 22 is received in the slot 23, and as the drilling motor continues to move rearwardly, the lateral guides 10 on the sliding support are withdrawn completely from the guideways 11 of the guide shell. The locking projection 22 is formed at the lower end of a member 24 which is mounted for vertical movement, and the upper end of this member is pivotally connected at 25 to a swingable lever 26. The lever 26 is pivotally mounted at 27 for vertical swinging movement on the upper portion of the sliding support 22 and has a beveled cam-like surface 28 at its rearward end. A coiled spring 29 interposed between a portion 30 on the member 24 and a bracket 31 integral with the sliding support 2, constantly urges the locking projection 22 toward its downward locked position. As shown, the member 25 is shaped laterally to clear the feed screw 15 while the locking projection 22 lies directly beneath the feed screw in a longitudinal vertical plane including the axis of rotation of the feed screw. The grasping portion 20 of the hand crank 19 is guided for sliding movement on a guiding projection 32 integral with the hand crank and this grasping portion is secured at 33 to a plunger 34 in turn slidingly mounted in a bore 35 in the guiding projection 32. A coiled spring 36 urges the plunger 34 in the forward direction into engagement with the inclined surface 28 on the latch 26. When the plunger 34 is moved forwardly its engagement with the inclined surface 28 causes the latch 26 to be swung upwardly about its pivot, thereby to raise the member 24 against the action of the coil spring 29 to release the locking projection 22 from the slot 23. As the plunger 34 moves axially, toward its foremost position shown in Fig. 5 to effect raising of the latch 26 into the released position shown, the plunger enters a longitudinal slot 37 in a projection 38 integral with the upper portion of the sliding support so that, as that time, the hand crank 19 is rigidly locked to the sliding support. The projection 38 is also slotted to receive the latch 26 and the upper portion of the member 24, as shown. The operator, grasping the grasping portion 20 of the hand crank, when the plunger 34 is projected into the slot 37, may, by turning the hand crank, swing the sliding support 2 together with the drilling motor 1, laterally in one direction or the other about a pivotal axis coincident with the axis of rotation of the feed screw 15. Lateral swinging movement of the support in either direction relative to the guide shell is limited by engagement of one of the surfaces 39 on the support with one of the surfaces 40 on the guide shell projection 18. When the sliding support 2 together with the drilling motor, is swung back into its centrally located position shown in full lines in Fig. 3, the operator may move the plunger 34 rearwardly to withdraw the same from the locking slot 37 and concurrently to release the latch 26 to permit downward movement of the member 24 to bring, prior to release of the plunger from the slot 37, the locking projection 22 back within the slot 23, thereby to lock the drilling motor to the guide shell. The feed screw may then be rotated by the hand crank to feed the sliding support forwardly to bring the guides thereof into the shell guideways. The guides 10 enter the guideways 11 before the locking projection 22 leaves the slot 23, in an obvious manner. Thus the hand crank 19 may be utilized not only to effect feeding of the drilling motor relative to the guide shell but also to effect swinging of the drilling motor into a laterally located position at one side or the other of the guide shell.

From the foregoing, it is evident that when it is desired to change drill rods, the drill rod may be released from the chuck 6 of the drilling motor and the drilling motor may be fed rearwardly to effect withdrawal of the drill rod from the chuck. The drilling motor may then be fed rearwardly into its rearmost position on the guide shell and at that time the locking projection 22 is received in the longitudinal slot 23 and the guides 10 of the sliding support 2 are withdrawn completely from the shell guideways 11. The grasping portion 20 of the hand crank 19 may then be manipulated to effect locking of the hand crank to the sliding support and to release the locking projection 22 from the slot 23. The operator, grasping the grasping portion 20 of the hand crank, may then manually swing the drilling motor laterally relative to the guide shell into one or the other of the laterally located positions indicated in dotted lines in Fig. 4 so that the drilling motor clears the drill hole. When the drilling motor is in this laterally located position the drill rod may be withdrawn from the drill hole longitudinally along one side of the drilling motor. When a new drill rod has been inserted in a drill hole or an additional rod section has been connected to the rod line, the drilling motor may again be swung into its centrally located position shown in full lines in Fig. 4, and when the drilling motor is in this position the plunger 34 may be moved rearwardly to release the latch 26 so that the locking projection 22 may drop into the slot 23, thereby to lock the drilling motor against lateral movement with respect to the guide shell. Upon further rearward movement of the plunger 34 the latter is withdrawn from the locking slot 37 on the sliding support projection 38 and the hand crank 19 may then be rotated to effect feed of the sliding support 2 forwardly to again bring the guides 10 thereof into the shell guideways 11. The drilling motor may then be fed forwardly along the guide shell to bring the chuck 6 into connection with the drill rod and thereafter the drilling operation may be resumed. Since the general mode of operation of the drilling apparatus disclosed is fully described in the copending application Ser. No. 432,951 above referred to, further description thereof is herein unnecessary.

As a result of this invention, it will be noted that a novel mounting means is provided for the drilling motor of a drilling apparatus whereby the drilling motor may be located in a position at one side or the other of the drill hole to clear the latter thereby to facilitate withdrawal from or insertion into, of the drill rods, the drill hole longitudinally along one side of the drilling motor. It will also be noted that by associating the feeding means with the novel motor mounting, the drilling motor may be swung into a lateral position by the hand crank of the feeding means. It is accordingly evident that the hand crank may not only be employed to effect feeding of the drilling motor, but also to effect lateral positioning of the drilling motor. Further by associating the motor lock with an element associated with the grasping portion of the hand crank of the feeding means, the drilling motor may be locked in its centrally located position while supported wholly independently of the shell guideways. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drilling apparatus, a guide shell providing a longitudinal guideway, a drilling motor mounted on said guide shell for movement along the guideway thereof, means for feeding said drilling motor along the shell guideway, said guide shell being so constructed as to permit movement of said drilling motor thereon into a position rearwardly of the shell guideway wherein said motor is supported independently of the guideway, and means for mounting said motor, when in said rearward position, for movement laterally selectively into positions at either side of said guide shell.

2. In a drilling apparatus, a guide providing a guideway, a drilling motor guided on said guide for movement along the guideway thereof, means for feeding said motor relative to said guide including a feeding element, means for mounting said drilling motor on said guide for movement laterally relative thereto, and means for connecting said feeding element to said motor for moving the same laterally as aforesaid on said mounting means.

3. In a drilling apparatus, a guide providing a guideway, a drilling motor guided on said guide for movement along the guideway thereof, said guide being so constructed as to permit movement of said motor into a rearward position wherein it is supported on said guide independently of the guideway thereof, means for feeding said motor relative to said guide including a feeding element, means for mounting said motor on said guide for movement laterally relative thereto, and means operative when said motor is in said rearward position for connecting said feeding element to said motor for moving the latter laterally as aforesaid on said mounting means.

4. In a drilling apparatus, a support providing guideways, a drilling motor mounted on said support for movement along the guideways thereof and having associated guides receivable in said support guideways, said support being so constructed as to permit movement of said motor into a rearward position with said guides withdrawn completely from said support guideways, and means connectible to said motor when the latter is in aforesaid rearward position for swinging said motor laterally relative to said support.

5. In a drilling apparatus, a support providing guideways, a drilling motor mounted on said guide for movement along the guideways thereof and having associated guides receivable in said support guideways, means for manually feeding said motor along said support guideways, said support being so constructed, and said feeding means being operative to feed said motor into a rearward position on said support with said guides withdrawn completely from said support guideways, and means connectible to said motor when the latter is in said rearward position for swinging the latter laterally relative to said support, said last recited means including an element of said feeding means.

6. In a drilling apparatus, a support providing guideways, a drilling motor mounted on said support for movement along the guideways thereof and having associated guides receivable in said support guideways, said support being so constructed as to permit movement of said motor into a rearward position thereon with said guides withdrawn completely from said guideways, releasable means for holding said motor against lateral movement relative to said support when said guides are withdrawn from said guideways, and means operable when said motor is in said rearward position and said holding means is released for moving said motor laterally relative to said support.

7. In a drilling apparatus, a support providing a longitudinal guideway, a drill motor mounted on said support for movement along the guideway thereof, said support and its guideway being so arranged and constructed as to permit movement of said motor into a position rearwardly of the support guideway, and means for mounting said motor on said support to permit lateral swinging movement of said motor relative to said support when said motor is in said rearward position thereon.

8. In a drilling apparatus, a guide member providing parallel guideways terminating short of the rear end of the said guide member, a drilling motor having associated guides receivable in said guideways and movable into a rearward position on said guide member with said guides withdrawn completely from said guideways, and mounting means for said motor whereby the latter when in said rearward position may be swung laterally selectively into positions at either side of said guide member.

9. In a drilling apparatus, a guide member providing parallel guideways terminating short of the rear end of the said guide member, a drilling motor having associated guides receivable in said guideways and movable into a rearward position on said member with said guides withdrawn completely from said guideways, means for feeding said motor along said guideways, said feeding means being operative to feed said motor rearwardly on said guide member beyond the rear ends of said guideways, and means associated with an element of said feeding means and operative when said motor is in said rearward position for swinging said motor laterally selectively into positions at either side of said guide member.

10. In a drilling apparatus, a guide shell providing longitudinal guideways, a drilling motor guided on said shell for movement along said guideways, said guide shell being so constructed as to permit movement of said motor into a position thereon rearwardly of said guideways, releasable means operative when said motor is in said rearward position for holding said motor against lateral movement relative to said guide shell, and means operative when said motor is in said rearward position and said holding means is released for moving said motor laterally relative to said shell.

11. In a drilling apparatus, a guide shell providing longitudinal guideways, a drilling motor guided on said shell for movement along said guideways, said guide shell being so constructed as to permit movement of said motor into a position on said shell rearwardly of said guideways, means operative when said motor is in said rearward position for holding said motor against lateral movement relative to said guide shell, said holding means including an element movable into a position to effect release of said holding means, and means operative when said motor is in said rearward position and said holding means is released for moving said motor laterally relative to said shell, said last recited means including said release-element.

12. In a drilling apparatus, a guide providing a guideway, a drilling motor movable along said guideway, said guide being so arranged and constructed as to permit movement of said motor on said guide into a position rearwardly of said guideway, and means for mounting said motor on said guide for swinging movement laterally selectively in either direction relative to said guide when said motor is in said rearward position.

13. In a drilling apparatus, a guide providing a guideway, a drilling motor movable along said guideway, said guide being so arranged and constructed as to permit movement of said motor on said guide into a position rearwardly of said guideway, means for feeding said motor relative to said guideway, and means operative when said motor is in said rearward position for swinging said motor laterally in either direction relative to said guide, said swinging means including an element of said feeding means.

14. In a drilling apparatus, a guide providing a guideway, a drilling motor movable along said guideway, said guide being so arranged and constructed as to permit movement of said motor on said guide into a position rearwardly of said guideway, means for feeding said motor relative to said guide including a feed operating handle, and means operative when said motor is in said rearward position on said guide for swinging said motor laterally in either direction relative to said guide, said swinging means including said feed operating handle.

15. In a drilling apparatus, a guide shell providing parallel longitudinally extending guideways, said shell having a projection extending rearwardly of said guideways, a motor mounted on said shell for longitudinal movement therealong and having associated guides receivable in said guideways, a rotatable feeding element extending longitudinally of and journaled on said shell at the ends thereof and a cooperating feeding element with which said motor moves longitudinally of said guide shell, a hand crank for rotating said rotatable feeding element relative to said cooperating feeding element to effect feed of said motor along said guideways, said guide shell being so constructed as to permit feeding of said motor into a rearward position onto said shell projection wherein said guides are withdrawn from said guideways, and means operative when said motor is in said rearward position for connecting said hand crank to said motor whereby said crank may effect swinging of said motor relative to said shell about an axis coincident with the axis of rotation of said rotatable feeding element.

WIN W. PAGET.